Patented Sept. 20, 1932

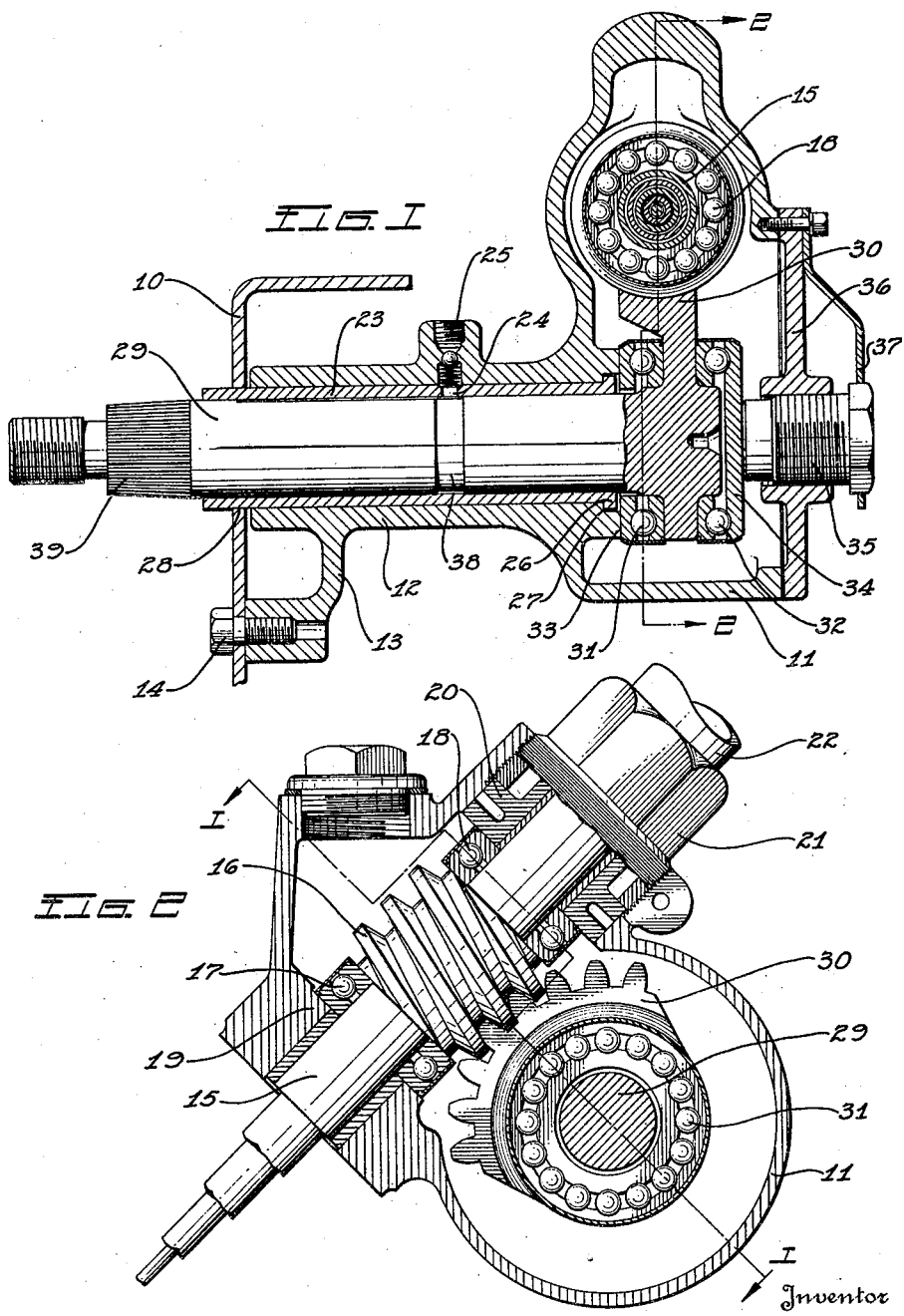

1,878,166

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed May 28, 1928. Serial No. 281,012.

This invention relates to motor vehicles and more particularly to steering mechanisms.

An object of the invention is the reduction of friction in steering mechanisms.

Another object of the invention is to provide a steering mechanism having a rock shaft provided with a plurality of thrust bearings.

Another object of the invention is to provide a steering mechanism having a rock shaft with a segmental gear positioned thereon and thrust bearings on the shaft arranged one on each side of the gear.

A further object of the invention is to provide a steering mechanism having a rock shaft provided with a segmental worm gear and a mounting for the shaft including a bushing and thrust bearings arranged one on each side of the gear with one of the bearings engaging the bushing, and means for adjusting the bearings.

Other objects of the invention will appear from the following description taken in connection with the drawing, which forms a part of this specification, and in which:

Figure 1 is a sectional view taken on line 1—1 of Fig. 2, and

Figure 2 is a sectional view taken on line 2—2 of Fig. 1.

Referring by numerals to the drawing, 10 represents a side member of a motor vehicle chassis frame having secured thereon a housing 11. As shown, the housing 11 is provided with a sleeve 12 having a flange 13 secured to the frame member as by bolts 14.

Extending through the housing is a steering post 15 having positioned therein the conventional control elements and positioned on the steering post within the housing is a steering worm 16 and arranged above and below the steering worm are thrust bearings 17 and 18. The lower bearing 17 is positioned between a shoulder 19 formed on the housing and the lower end of the steering worm, and the upper bearing 18 is positioned between the upper end of the steering worm and a sleeve 20, engaging which is a bearing adjustment nut 21 positioned on a steering tube 22 and threaded into the casing.

The sleeve 12 has positioned therein a bushing 23 provided with an aperture 24 which registers with a lubricating duct 25 in the sleeve 12. As shown, the bushing 23 has a flange 26 engaging a shoulder 27 in the sleeve and the bushing is of sufficient length to extend beyond one end of the sleeve 12 through an opening 28 in the side member 10. Positioned in the bushing 23 is a rock shaft 29 having thereon within the housing a gear segment 30 in mesh with the worm gear 16 on the steering post and positioned on the rock shaft are inner and outer thrust bearings 31 and 32.

The inner bearing 31 is positioned between a shoulder 33 formed on the sleeve substantially flush with the flange on the bushing 23 and the flange of the segmental gear 30, and the outer bearing 32 which is provided with a disk race 34 in lieu of the conventional ring race is positioned on the end of the shaft between the flange of the segmental gear and an adjustable screw 35 threaded in a cover plate 36 secured on the casing in any preferred manner, the adjustment screw being retained in adjusted position by means of a retaining member 37 suitably secured to the cover plate.

The rock shaft 29 is provided with a circumferential groove 38 which registers with the aperture 24 in the bushing to facilitate the lubrication of the shaft and the outer end of the rock shaft is tapered and splined as indicated at 39 to receive the eye of a crank arm, not shown, or other suitable means of securing the crank arm may be employed.

Although this invention has been described in connection with certain specific embodiments, the principles involved are susceptible of numerous other applications which will readily occur to persons skilled in the art. The invention is, therefore, to be limited only as indicated by the scope of the appended claims.

Having thus described the various features of my invention, what I claim as new and desire to secure by Letters Patent is:

1. In a steering mechanism, the combination of a housing having a bearing therein, a steering post having a worm gear thereon within the housing, a rock shaft having a gear segment at one end thereof, said rock shaft being mounted in the housing bearing with its gear segment in mesh with said worm gear, an annular ball thrust bearing between said rock shaft and the housing at one side of the gear segment, an annular ball thrust bearing for the rock shaft at the other side of said gear segment, said latter bearing including an abutment means, and adjustable means mounted in the housing and operating against said abutment means to position the rock shaft endwise and to thereby accurately hold the gear segment relative to the worm gear with which it meshes.

2. A steering mechanism comprising a housing having a sleeve formed integral therewith, a cover for the housing, a set screw threaded in the cover, a bushing in the sleeve having a flange engaging a shoulder in the sleeve, a rock shaft journaled in the bushing, a gear on the rock shaft within the housing arranged to provide a shoulder at the cover end of the shaft, a bearing on the rock shaft between a shoulder in the housing and the flange of the gear and a second bearing, having a disk race, on the shoulder at the cover end of the rock shaft between the flange of the gear and the set screw.

3. A steering mechanism comprising a housing having a sleeve formed integral therewith, a steering post extending through the housing, a worm gear in the housing and fixed on the steering post, a cover for the housing, a bushing in the sleeve, a flange on the bushing engaging a shoulder within the housing, a rock shaft journaled in the bushing and extending into the housing, a segmental gear carried by the rock shaft and meshing with the worm gear in the housing, a bearing on the shaft between a shoulder within the housing and the flange of the segmental gear, said bearing retaining the bushing in position, a second bearing on the other side of the flange of the segmental gear having a disk ball-race member extending parallel with the end of the shaft in the housing, and a screw threaded through the cover to engage the central portion of the disk ball-race.

4. In a steering mechanism, a housing having an integral sleeve extending outwardly from a wall thereof and an inwardly extending circular flange coaxial with the sleeve, a detachable housing wall opposite the circular flange, a steering post extending through the housing, a worm gear fixed on the post within the housing, a bushing in the sleeve having a flanged end telescoped by the projecting circular wall flange, a rock shaft extending through the bushing and projecting into the housing, a segmental gear in the housing fixed adjacent the end of the rock shaft and meshing with the worm gear, a ball bearing structure surrounding the rock shaft intermediate the circular wall flange and the segmental gear, one of the races being adapted to engage the end of the circular flange and the other race being adapted to engage the gear segment, another ball bearing on the other side of the segmental gear including a race surrounding the rock shaft and adapted to engage the segmental gear and a disk race traversing the end of the shaft but spaced therefrom, and a screw abutment member extending through the removable housing wall and engaging the center of the disk race to hold the bearings and gear segment axially in the housing with the bearings engaging the segment and with one of the bearing races engaging the circular wall flange.

In testimony whereof I affix my signature.

ALFRED MOORHOUSE.